(12) United States Patent
Ramsey

(10) Patent No.: US 9,097,233 B1
(45) Date of Patent: Aug. 4, 2015

(54) SUCTION-AUGMENTED HYDROPOWER TURBINE

(76) Inventor: Dennis Allen Ramsey, Eugene, OR (US)

(*) Notice: Subject to any disclaimer, the term of this patent is extended or adjusted under 35 U.S.C. 154(b) by 863 days.

(21) Appl. No.: 13/134,248

(22) Filed: Jun. 1, 2011

Related U.S. Application Data

(60) Provisional application No. 61/396,714, filed on Jun. 1, 2010.

(51) Int. Cl.
*F03B 17/06* (2006.01)
*F04D 29/64* (2006.01)
*F03B 13/10* (2006.01)

(52) U.S. Cl.
CPC ............ *F03B 17/061* (2013.01); *F04D 29/642* (2013.01); *F04D 29/648* (2013.01); *F03B 13/10* (2013.01)

(58) Field of Classification Search
CPC ........................................................ F03D 1/04
USPC .................. 415/3.1, 4.1, 221, 222, 906, 908; 416/85; 417/183
See application file for complete search history.

(56) References Cited

U.S. PATENT DOCUMENTS

| 61,362 | A | | 1/1867 | Rowe |
|---|---|---|---|---|
| 507,294 | A | | 10/1893 | Vance |
| 2,025,577 | A | * | 12/1935 | Diehl ............................. 417/167 |
| 3,986,787 | A | * | 10/1976 | Mouton et al. ..................... 415/7 |
| 4,021,135 | A | * | 5/1977 | Pedersen et al. ........... 415/208.2 |
| 4,095,918 | A | | 6/1978 | Mouton, Jr. et al. |
| 4,163,904 | A | | 8/1979 | Skendrovic |
| 4,166,596 | A | * | 9/1979 | Mouton et al. ................... 244/30 |
| 4,219,303 | A | | 8/1980 | Mouton, Jr. et al. |
| 4,274,009 | A | | 6/1981 | Parker, Sr. |
| 4,524,285 | A | | 6/1985 | Rauch |
| 4,545,726 | A | * | 10/1985 | Holliger .......................... 415/26 |
| 4,568,042 | A | | 2/1986 | Carr |

(Continued)

FOREIGN PATENT DOCUMENTS

| DE | 202007017544 U1 | * | 4/2009 |
|---|---|---|---|
| EP | 2077227 A2 | * | 7/2009 |
| WO | WO 2009074254 A2 | * | 6/2009 |

OTHER PUBLICATIONS

Gregory Potts, "100 MPH From Hand-Launched Glider!" Mustang Inventor's High-Speed Toy Takes Off, *The Oklahoman*, Dec. 25, 2002, 2 pages.

(Continued)

*Primary Examiner* — Nathaniel Wiehe
*Assistant Examiner* — Michael Sehn
(74) *Attorney, Agent, or Firm* — Klarquist Sparkman, LLP

(57) ABSTRACT

The present invention is a hydrokinetic turbine consisting of a multi-stage suction-producing engine for converting the kinetic energy of canal or river flow into mechanical energy to power an electrical generator. It can be described as a ducted rotary hydro-craft, which has a buoyant body of fiberglass, ABS plastic, or other suitable material, comprising a concentric funnel and nozzle which enclose a torpedo-shaped hydrofoil structure at their center. A rotor or propeller attached to the torpedo-shaped internal structure drives an electrical generator. These ducts create suction forces that pull water through the rotor by creating an extreme low pressure zone behind the rotor, and this force combined with the direct pressure of canal flow onto the face of the rotor, produces an augmented volume of power.

17 Claims, 3 Drawing Sheets

(56) References Cited

U.S. PATENT DOCUMENTS

Figure 1:
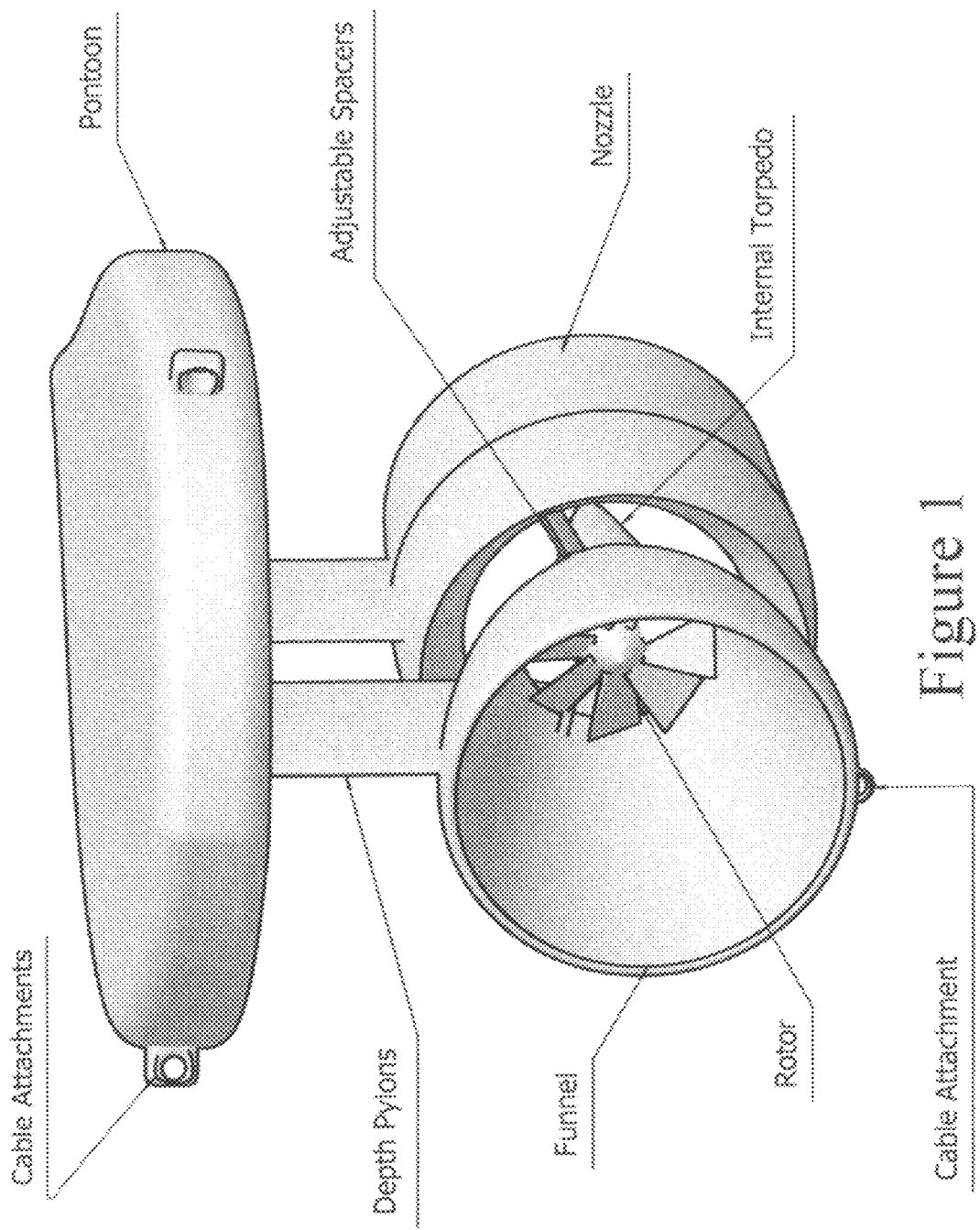

| | | | |
|---|---|---|---|
| 4,579,300 A | 4/1986 | Carr | |
| 4,868,408 A | 9/1989 | Hesh | |
| 5,464,320 A | 11/1995 | Finney | |
| 6,013,955 A | 1/2000 | dos Santos Costa | |
| 6,126,385 A * | 10/2000 | Lamont | 415/4.5 |
| 6,472,768 B1 | 10/2002 | Salls | |
| 7,147,428 B2 | 12/2006 | Lamont | |
| 7,258,302 B2 | 8/2007 | Carr et al. | |
| 7,372,172 B2 * | 5/2008 | Winkler et al. | 290/43 |
| 7,456,514 B2 | 11/2008 | Ahmad | |
| 7,471,009 B2 * | 12/2008 | Davis et al. | 290/54 |
| 7,484,929 B1 * | 2/2009 | Fitzpatrick | 415/116 |
| 8,022,567 B2 * | 9/2011 | Davis et al. | 290/54 |
| 8,147,284 B2 * | 4/2012 | Banks et al. | 440/67 |
| 2008/0093861 A1 * | 4/2008 | Friesth et al. | 290/55 |
| 2009/0267347 A1 * | 10/2009 | Abatemarco | 290/43 |
| 2010/0289268 A1 * | 11/2010 | Schiller | 290/54 |

OTHER PUBLICATIONS

Robert Carr, "How the 'Internal Wing' Works," Dec. 2, 2003, 2 pages.

* cited by examiner

SUCTION-AUGMENTED HYDROPOWER TURBINE

CROSS REFERENCE

This non-provisional patent application claims the benefit of provisional patent application No. 61/396,714, filed on Jun. 1, 2010.

STATEMENT REGARDING FEDERALLY SPONSORED RESEARCH OR DEVELOPMENT

Applicant has not received or applied for any assistance from any federal institution for research or development.

BACKGROUND OF THE INVENTION a) Field of the Invention

This invention relates to the field of prime mover hydro turbines, specifically describing a means of generating significant amounts of electrical power from man-made canals and other slow natural waterways such as rivers, tidal basins, etc., by manipulating flowing current through, over, and around a buoyant, shaped structure. Dynamic flow through a rotor is accomplished by creating a suction vortex behind the rotor that draws increased pressurized flow through the turbine.

b) Description of the Related Art

Hydropower devices are many, from waterwheels to modern reaction turbines, to the newer hydrokinetic devices which are presently being developed to take advantage of tidal, estuary, river, or canal flow. Recent historical realities are causing us to focusing new attention on the various untapped power resources of the planet so that we might capture an increasing portion of our power needs from renewable resources.

Many of the numerous patented inventions in this class are designed to use ducting and venturi structures to accelerate water through a turbine to increase the kinetic energy density of slow flowing water. Some of these inventions are symmetrical in that they are intended to capture energy from flow in both directions, as in estuary or tidal currents. Some also are intended to be mounted in large banks of identical turbines so that they can capture useful amounts of power from the Gulf Stream or other such meandering undersea currents.

As far back as 1867, Rowe patented a "Water Wheel" U.S. Pat. No. 61,362 which is substantially similar to the prior art in that it places a funnel-like structure within a floating, shaped box so that the flow is concentrated onto paddles in a constricted area at the exit port. This invention is extremely advanced for its time, and it is the first prior art from which modern inventions of this class derive.

There are only a very small number of inventions of this class that attempt to create suction to augment the power factor. Inventions such as Lamont's U.S. Pat. No. 7,147,428, and Parker's U.S. Pat. No. 4,274,009 in particular, do employ suction forces to increase turbine output. Lamont's Hydro Turbine places a converging ring around the downstream output of a turbine-containing tube to lower the back pressure behind the rotor. Mouton's inventions U.S. Pat. Nos. 4,219,303, 4,095,918, 4,166,596, and 3,986,787 all use a form of diffuser-augmented turbine with concatenated nozzles or venturis to accelerate or focus flow, and his duct's outside surfaces are diverging, in contrast to Lamont's converging flow at the exit port. This opposite orientation of these important functional elements illustrates the hydrodynamic debate amongst inventors as to the correct design requirements for reintegrating flow into the mainstream after it leaves the turbine housing.

Finney's Superventuri Power Source, U.S. Pat. No. 5,464,320, describes a multi-stage suction turbine with internally angular elements similar to the present invention. While there are some conceptual similarities with the present invention, there are many more dissimilarities, such as his placement of a blade for capturing energy in the flow path of the last downstream element, while the present invention uses the last downstream element to suck flow out of the first element and thereby induce flow past the rotor, rather than directing manipulated flow onto a blade structure. Finney also does not make use of the outside surfaces of his elements to manipulate or act upon flow, and merely makes them straight as in a tube. It is clear that Finney's invention is not intended for use in water flows, as there is no design element inherent in his device for capturing an incompressible, high-density fluid such as water.

Hesh's U.S. Pat. No. 4,868,408, a Portable water-powered electric generator contains one similar element to the present invention that is not contained in any of the other prior art, and that is a flask-shaped structure behind a constricted port which roughly corresponds to the torpedo-shaped structure at the center of the present invention's shaped bodies. However, Hesh ascribes no function to this element in his patent, and merely describes it as a means for containing a dynamo. It has no other stated purpose, nor does it share any similar function to any component of the present invention.

Salls' Hydrokinetic Generator U.S. Pat. No. 6,472,768B1, is a submersible scoop-like structure with a hollow, tapered inner chamber to funnel flowing water through a turbine. This prior art employs a tapered outer hull to increase flow velocity past the hull with the intent to create lower pressure behind the hull, so that increased flow through the inside of the hull and through the turbine is accomplished. Although Salls' hull can be described as converging/diverging, and common to much prior art of this class, a primary difference in function is that Salls did not consider a secondary hull behind the first to further manipulate flow or to use focused suction forces, as the present invention does.

Parker's U.S. Pat. No. 4,274,009 is the only discovered prior art that uses artificial structures to create a rotary nappe, and alone shares this similarity to the present invention. A nappe is the suction gap created by water flowing over a weir. When a weir is closed to the outside atmosphere, the lowered pressure created by the accelerated flow over the weir sucks water if it is closed to the atmosphere, or sucks air if it is open. Parker places a shroud ring ahead of a torpedo-shaped structure, and natural flow of sufficient velocity causes a suction nappe to be formed on the outer surface of the torpedo structure. There are several distinct differences compared to the present invention. First, Parker's forward structure takes the shape not of a funnel, as in the present invention, but an inverted funnel. His assumption seems to be that the suction nappe will draw sufficient flow through the rather small port of the inlet of his shroud ring to generate useful energy.

Two elements are shared by both the present invention and Parker's device, and that is the use of a torpedo-shaped structure to hold a nappe, and the use of some form of ducting structure ahead of the torpedo to direct flow. However, the two inventions differ substantially in that the present invention employs a funnel and nozzle of differential shape and function to self-create the suction nappe, uses a Kaplan-style hydro propeller on a larger portion of the torpedo, and employs a second stage of ducting and suction to entrain and control flow through a multi-stage, multi-functional conduit.

Although the two inventions share the concept of creating a suction nappe, the nappes are produced by different methods, different means, and with a combination of different elements. Parker makes no attempt, for example, to use any of his own means to produce velocity of flow sufficient to produce a nappe, and so his device is dependent upon nature to produce flow of sufficient velocity to build the nappe. The present invention employs a funnel and a nozzle around the torpedo concentrically to produce an artificial flow environment around the torpedo such that the flow velocity required to build and maintain a powerful nappe, is inherent in the invention itself, and in fact is the primary purpose of the present invention's nozzle.

Mouton's River Turbine, U.S. Pat. No. 3,986,787, most closely physically resembles the present invention and a description of the significant differences to the present invention, with a commentary on the technical problems of Mouton's patent, which the present invention overcomes and solves, constitutes a significant portion of the Detailed Description of the Invention below.

FIELD OF SEARCH

60/325,515. 290/2.1,3.1,4.1,7,8,42,43,52,53,54. 415/3.1, 7, 8, 26, 55.2, 148, 202.

References Cited:

| | | | |
|---|---|---|---|
| 7456514B2 | November 2008 | Ahmad | 290/54 |
| 7147428B2 | December 2006 | Lamont | 415/1 |
| 6472768B1 | October 2002 | Salls | 290/54 |
| 6013955 | January 2000 | dos Santos Costa | 290/54 |
| 5464320 | March 1994 | Finney | 415/60 |
| 4868408 | September 1988 | Hesh | 290/52 |
| 4524285 | February 1984 | Rauch | 290/43 |
| 4274009 | June 1981 | Parker | 290/43 |
| 4219303 | August 1980 | Mouton et al. | 415/7 |
| 4163904 | August 1979 | Skendrovic | 290/54 |
| 4095918 | June 1978 | Mouton et al. | 415/7 |
| 3986787 | October 1976 | Mouton et al. | 415/7 |
| 507294 | October 1893 | Vance | 415/7 |
| 61362 | January 1867 | Rowe | 415/7 |

SUMMARY OF THE INVENTION

The present invention differs from and improves over the prior art by placing a uniquely useful structure in the center of specifically shaped concentric nozzles to affect a suction seal behind the rotor, and employs that suction to augment the power available at the rotor. The present invention self-creates and maintains a rotary nappe, which pulls water through the rotor by creating an extreme low pressure zone behind the rotor, and this suction combined with the direct pressure of canal flow onto the face of the rotor within the funnel, produces an augmented volume of power that is not otherwise possible in low velocity flow, and constitutes a significant improvement over the prior art.

The present invention improves the capture of available power through the use of focused suction forces, and without disrupting the flow rate or the primary purpose of canals, which is water deliveries to consumers, nor does the present invention require any new civil works to be constructed in order to deploy it along canals or other waterways, because it is a buoyant flotation craft of light yet strong construction. It is deployed on canals or rivers easily by launching it like a boat from a service truck with a cable winch. Cables are attached to the labeled points (FIG. 1) so that it rides in a triangular sling or harness in the center of a canal, and no new civil works are required to install it other than a reinforced pylon attachment point on each side of the canal. Once the throat of the craft is turned into the flow, the resistance forces of canal flow pushing on the face of the craft cause the craft to submerge and be held in place both by the triangulated cables at the attachment points, and the flotation pontoon (FIG. 1) which limits the depth the craft is able to be submerged.

The gap between the elements is also adjustable, so that flow velocity can be tuned such that harmonic suction and maximum power point matching of the power output can be accomplished. The depth of the structure, as it rides the center of a canal, can also be adjusted by the depth pylons (FIG. 1) so that the center of the rotor is always at critical depth. The critical depth, combined with the flow velocity et volume, determines the kinetic energy the device captures, and these parameters are adjustable using the actuators (FIG. 1, Adjustable Spacers) and the depth pylons. Automating these functions creates a turbine that is always self-adjusting as flow conditions change: the center of the rotor will always be at critical depth, and the maximum flow velocity will constantly be maintained.

These features of the present invention constitute a significant and original improvement over the prior art. The invention's purpose is to make practical the use of water supply canals and other low-head conveyances for generating useful volumes of power, as well as to improve hydro turbines in general.

DESCRIPTION OF THE DRAWING VIEWS

FIG. 1 shows the entirety of the invention, in isometric frontal view. This point of view is looking into the mouth of the invention as if the viewer were looking downstream of a flow of water as it enters the device.

Figure 2:
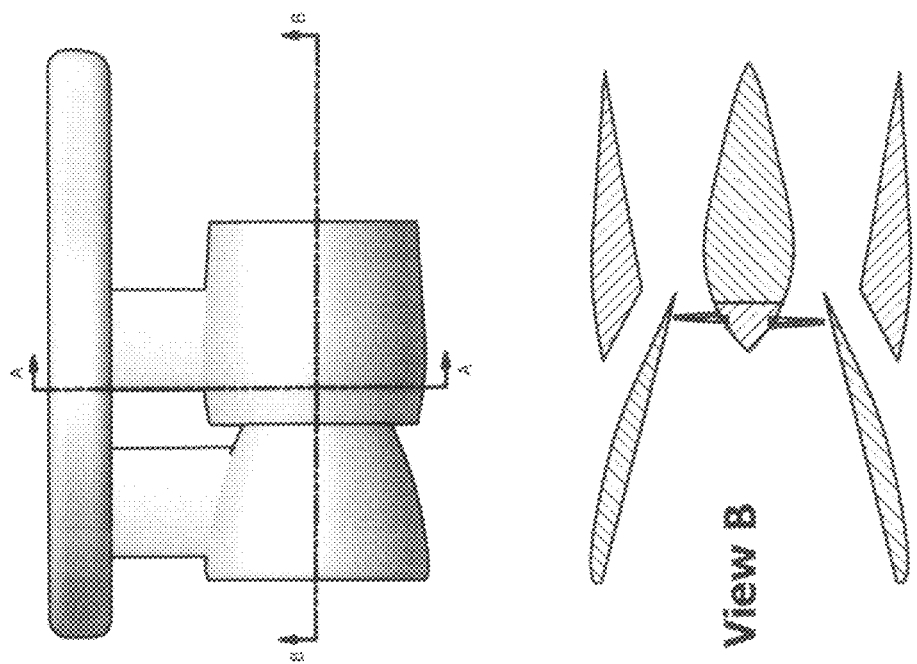
Figure 2:
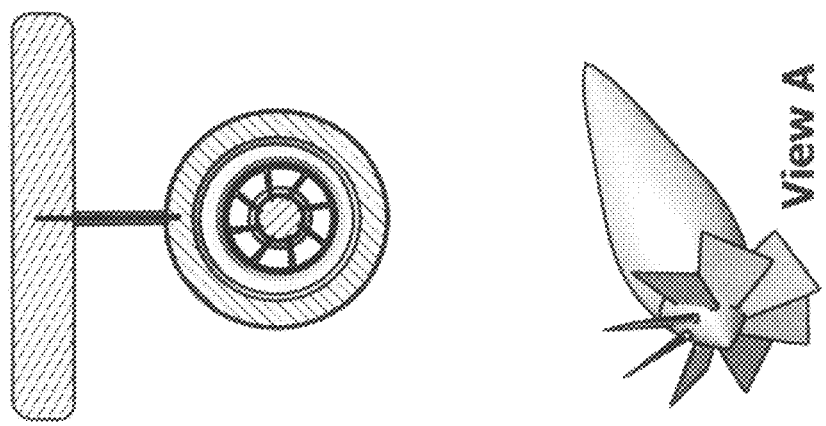

FIG. 2 contains the sectional views. The internal torpedo structure is shown alone for clarity in View A. Particular attention to the schematic representation of View B reveals the functional arrangements of the inventive matter. The shapes and relationships of the elements are extremely important because they perform the divergent/convergent tasks of processing flow as it transits through the device.

Figure 3:
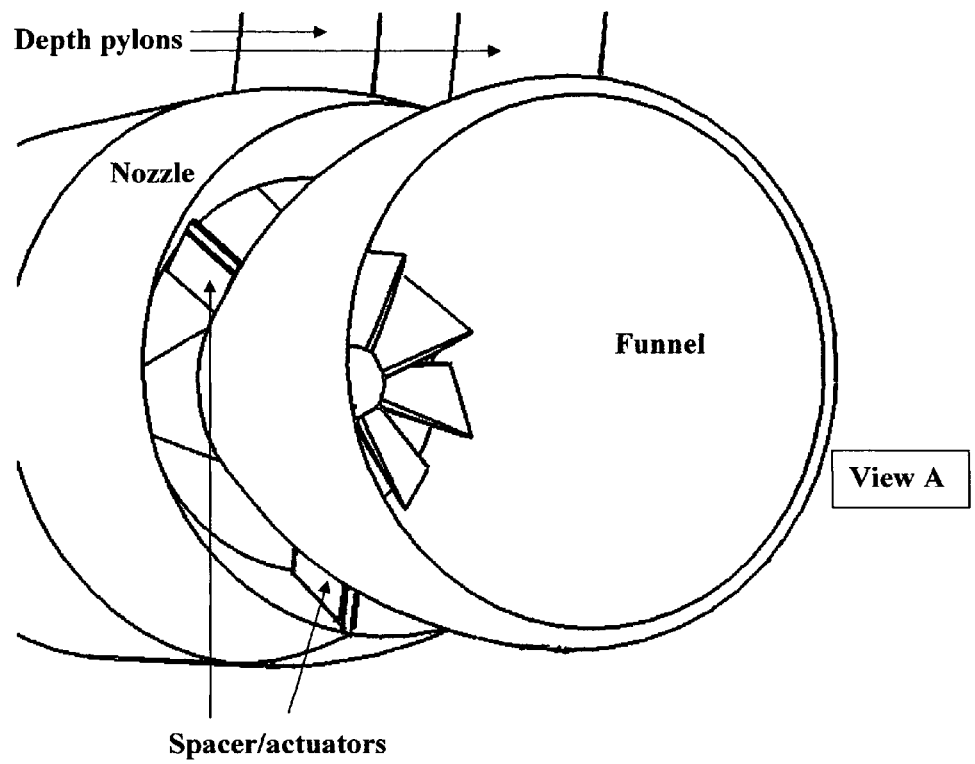
Figure 3:
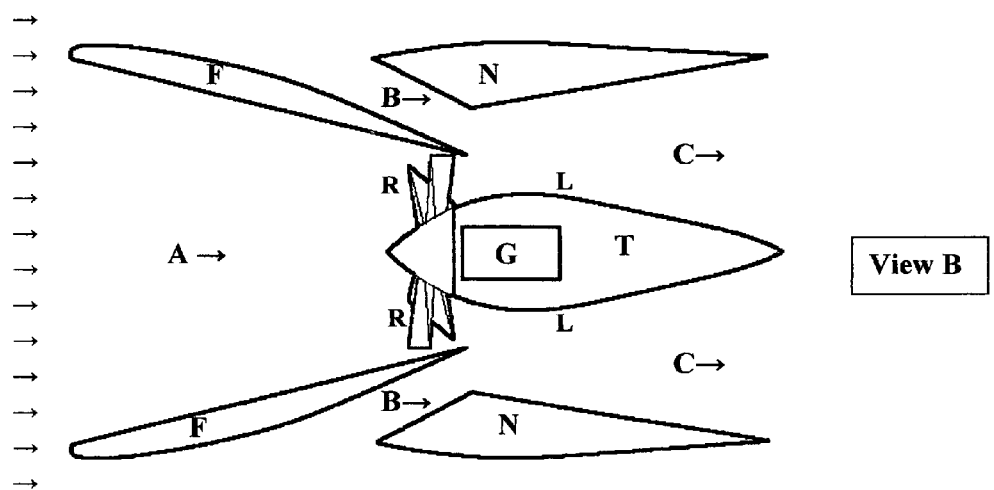

FIG. 3 shows two views of the invention. View A is a close-up of the inventive elements, showing the funnel, rotor, torpedo, nozzle, spacers, and pylons. This view is provided for purposes of visualizing flow through the device. View B, is the functional diagram. The invention comprises a funnel (F), a torpedo-shaped structure (T) with attached rotor (R), a nozzle (N), and energy generating means (G) inside the torpedo (T). Canal flow (A) enters the front funnel (F) and strikes the rotor (R), while side flow (B) enters around the front edge of the nozzle (N). The craft's resistance to these flow forces causes the entire turbine to submerge, and be held in position by a 3-point cable harness (refer to FIG. 1, cable attachment points).

FIG. 1 shows the adjustable spacers between the forward funnel and the rearward nozzle. These actuators function to alter the relative position of these two elements so that the gap between the funnel and nozzle can be tuned to increase or decrease flow velocity through the gap and thereby adjust the amount of suction behind the rotor. FIG. 1 also shows the adjustable depth pylons which function to adjust the depth of the elements in canal flow.

DETAILED DESCRIPTION OF THE INVENTION

The object or purpose of this invention is to make practical the extraction of significant and larger amounts of electrical energy than was previously possible in the prior art, from the slow yet massive flows of water commonly found in canals in particular, and rivers and other flowing bodies in general.

Ahmad, in his U.S. Pat. No. 7,456,514 B2, gives a very precise account of canal hydrodynamics that clearly explains the manipulation of flow forces that the present invention accomplishes. Canal flow is typically sub-critical in flow speed, and this is why extracting useful power from canals is problematic: velocity is too low. Kinetic energy increases at the square of velocity; therefore artificially increasing velocity is the only way to capture useful volumes of energy. The task of any innovation would be to increase the flow velocity to the super-critical range, similar to a Parshall Flume. During sub-critical flow, gravitational forces dominate but during super-critical flow, inertial forces dominate. Once flow goes super-critical inside the invention, hydrodynamic laws change, creating a more advantageous environment for power extraction. The Parshall flume provides the hydrodynamic model for describing the present invention, and in a significant fashion the present invention behaves like a floating rotary Parshall flume. In the Parshall flume, open flow is constricted and converged, and then the floor level drops causing flow to hydraulically jump to super-critical flow velocity. The present invention has similar dynamics to a Parshall flume, but one essential difference is that flow is submerged and closed to the atmosphere so that super-critical flow, rather than drawing down canal height due to the increased velocity, draws increased flow through the entrance ports due to these controlled inertial suction forces.

To reduce the invention to its basic hydrodynamic functions: the invention creates a suction vortex behind the rotor and on the surface of the internal torpedo: 1) the suction seal, or rotary nappe, of the laminated flow onto the torpedo, 2) the pressure transition zone at the center of the secondary nozzle, and 3) the overall pressure curtain created by canal side-flow passing around the craft which reinforces the submerged atmospheric seal internal to the craft. Further, the velocity of flow entering the nozzle and creating direct suction behind the rotor, is controlled by tuning the gap between the funnel and the nozzle by moving them closer or farther apart. This is accomplished by actuators at positions between the funnel and nozzle, see FIG. 1, Adjustable Spacer, and FIG. 4, View A, Spacer Actuator.

Water flow is processed in various ways by the arrangement of the inventive elements (reference FIG. 3, View B). Flow first enters the nozzle at A and will impinge on the rotor R with the main force of the flow. The rotor is connected with an electrical generating means G arranged inside of the torpedo, T. A considerable portion of the flowing water will overspill or entirely miss the entrance of the funnel F and will accelerate around the airfoil-shaped outside of the funnel to point B, the entrance to the nozzle N. This inward converging accelerated flow will laminate onto the internal torpedo at approximately point L, forming a suction seal behind the rotor in the space B-L. Once this flow passes a short distance across the internal torpedo it begins its exit from the venturi space of N, at point C, by expanding into this space and increasing in pressure while lowering in velocity, establishing a transition zone at the center of the nozzle at C. Significantly, all canal flow that has not passed either through the rotor inside funnel F or around the rotor R and into the nozzle N, will all be flowing around the outsides of the main body of the craft, and this has the effect of an overall pressure curtain created by canal side-flow passing around the sides of the craft and reinforcing the suction head behind the rotor from the immense magnitude of canal side-flow. The mass of flow within the canal or waterway is induced toward the canal center by the introduction of the artificial structure which constitutes this invention, and gravity induction pulls the power density towards the center of the waterway where the present invention is tethered.

It is essential for any turbine to function properly that captured flow leaves the turbine rather than choking at the exit port. All horizontally oriented turbines of this type must perform three basic functions on water flow: converge flow to focus the kinetic energy, capture that energy which slows the flow considerably, and then diverge the focused flow so that it can reintegrate with mainstream flow outside of the turbine. Internal flow must easily and smoothly rejoin mainstream canal flow rather then being impeded by it, otherwise turbine efficiency is impaired. In the prior art such as Mouton's River Turbine, and many others, it is common to try to accomplish this by making the exiting lip of the downstream-most duct outward turning, or axially divergent, so that mainstream flow is forced to diverge away from the exit port, presumably making space for exiting flow. The same function is accomplished better in the present invention with the converging hydrofoil of the outer skin of the nozzle (N), which accelerates flow past the exit port, lowering the pressure and drawing out the internal flow. The divergent function which is required to prepare the captured flow for reintegration with the mainstream is performed by the present invention inside the exiting nozzle near the tip of the torpedo structure, i.e., the internal shapes provide the diverging (expanding) flow path necessary. What is required is space for the low pressure/high velocity flow detaching from the torpedo's skin to expand back to sub-critical velocity and pressure so that it can reintegrate with canal mainstream flow. The nozzle's outer profile is hydrofoil, and it facilitates this reintegration of captured flow by creating lift behind the downstream exit port, pulling captured flow out of the turbine.

In the preferred embodiment, flow velocity is measured by sensors at various points both inside and outside of the invention so that tuning the gap is automated and is therefore in-step with pumping schedules, and could also be linked by radio-control to the water agency's control center such that the water delivery schedule is anticipated. The preferred embodiment would also include a trash screen mounted at the front of the device to prevent debris from entering. In various alternate embodiments of the invention, the size ratios of the three main elements are longer and/or of varying diameter to any other elements, there may be other additional nozzles, and there may be other rotors or energy capturing means mounted within the flow space.

The present invention particularly differs from the prior art in the shape of the bodies of the funnels/nozzles such that they are specifically shaped to provide differential functions from inside to outside. Only one of the prior art inventors uses this concept, albeit by opposite fashion to the present invention. Mouton's Turbine wheel with catenary blades U.S. Pat. No. 4,095,918, and his River Turbine U.S. Pat. No. 3,986,787 both use an arrangement of concentric nozzles, yet his hydrofoil shape is exactly opposite, inside to outside, as the present invention, i.e., his insides are hydrofoil while the outsides are straight line, while the present invention reverses and further modifies this structure and the functions such structure provides. The essential difference is in how the nozzles are used to produce convergent and divergent flow conditions within and around the floating turbine.

Compare Mouton's U.S. Pat. No. 3,986,787, FIG. 2, to the present invention's FIG. 3, View B. The arc of the profiles of the ducting elements are opposite in form, i.e., the present invention employs a hydrofoil shape on the outsides of each element in order to accelerate flow into the next downstream functional zone. Mouton employs hydrofoil shapes on the insides of his elements in order to accelerate flow within each element itself. The shapes of the ducting elements are opposite compared with the present invention. The present invention places the hydrofoils on the outsides in order to use the acceleration/pressure function of a hydrofoil to accomplish completely different tasks, and thereby define uniquely different functional zones.

I claim:

1. An apparatus for extracting energy from fluid flow comprising:
    an inlet duct having an inlet end portion and an outlet end portion, the inlet duct having an annular inner surface tapering in a direction from the inlet end portion to the outlet end portion, the inlet duct defining a central flow axis;
    an elongated body aligned along the central flow axis and extending rearwardly past the outlet end portion of the inlet duct, the elongated body having a forward end portion and rearward end portion;
    a rotor coupled to the elongated body, the rotor comprising a plurality of rotatable blades that are rotatable about the central flow axis; and
    a nozzle positioned concentrically about the elongated body, the nozzle having a forward end portion and a rearward end portion, the forward end portion being disposed adjacent the outlet end portion of the inlet duct to define an annular flow channel between the forward end portion of the nozzle and the outlet end portion of the inlet duct for channeling fluid inwardly onto the outer surface of the elongated body;
    wherein the nozzle has an inner surface configured to channel fluid outside of the inlet duct to flow inwardly through the flow channel and contact the outer surface of the elongated body, thereby creating a suction that enhances fluid flow through the inlet duct and the blades of the rotor;
    wherein a cross-sectional profile of the nozzle in a plane extending through the nozzle and along the central flow axis comprises an outer surface in the shape of a hydrofoil;
    wherein the cross-sectional profile of the nozzle has an inner surface comprising a first portion and a second portion, the first portion of the inner surface tapering from a forward end of the nozzle to an intermediate location, the second portion of the inner surface diverging from the intermediate location to a rearward end of the nozzle, wherein the first and second portions of the inner surface are flat in the cross-sectional profile.

2. The apparatus of claim 1, wherein the elongated body comprises a housing that houses a generator.

3. The apparatus of claim 2, wherein the housing comprises an outer surface comprising a hydrofoil cross-sectional profile in a plane extending through the housing and along the central flow axis.

4. The apparatus of claim 1, wherein the blades are disposed within the outlet end portion of the inlet duct.

5. The apparatus of claim 1, wherein the inlet duct has an outer surface comprising a hydrofoil cross-sectional profile in a plane extending through the inlet duct and along the central flow axis.

6. The apparatus of claim 1, wherein the forward end portion of the nozzle partially overlaps the outlet end portion of the inlet duct.

7. The apparatus of claim 1, further comprising a flotation device supporting the inlet duct, the elongated body and the nozzle.

8. The apparatus of claim 1, further comprising an adjustable spacer connecting the inlet duct to the nozzle, the spacer being configured to adjust the spacing between the inlet duct and the nozzle in an axial direction along the length of the central flow axis.

9. The apparatus of claim 8, further comprising a sensor configured to measure the flow of fluid through the apparatus, the adjustable spacer being configured to automatically adjust the spacing between the inlet duct and the nozzle based on the measured flow of the fluid.

10. An apparatus for extracting energy from fluid flow comprising:
    an inlet duct having an inlet end portion and an outlet end portion, the inlet duct defining a central flow axis and configured to direct fluid to flow through the inlet duct in a direction extending from the inlet end portion to the outlet end portion;
    an elongated body aligned along the central flow axis, the elongated body having a forward end portion and rearward end portion;
    a rotor coupled to the elongated body, the rotor being rotatable about the central flow axis; and
    a nozzle positioned concentrically about the elongated body, the nozzle having a forward end portion and a rearward end portion, the forward end portion being disposed adjacent the outlet end portion of the inlet duct to define an annular flow channel between the forward end portion of the nozzle and the outlet end portion of the inlet duct for channeling fluid inwardly onto the outer surface of the elongated body;
    wherein the nozzle is configured to channel fluid outside of the inlet duct to flow inwardly through the flow channel and contact the outer surface of the elongated body, thereby creating a suction that enhances fluid flow through the inlet duct and the blades of the rotor;
    wherein the nozzle has a hydrofoil-shaped outer surface and an inner surface comprising a first portion and a second portion, the first portion of the inner surface tapering from a forward end of the nozzle to an intermediate location, the second portion of the inner surface diverging from the intermediate location to a rearward end of the nozzle, wherein the first and second portions of the inner surface are flat in a cross-sectional profile taken along a plane bisecting the nozzle and extending along the central flow axis.

11. The apparatus of claim 10, wherein the rearward end portion of the elongated body extends downstream of the outlet end portion of the inlet duct in a direction extending along the central flow axis.

12. The apparatus of claim 11, wherein the rotor is mounted on the forward end portion of the elongated body and the rotor comprises a plurality of blades disposed within the outlet end portion of the inlet duct.

13. The apparatus of claim 11, wherein the elongated body portion comprises a housing that houses a generator connected to the rotor.

14. The apparatus of claim 10, further comprising a flotation device supporting the inlet duct, the elongated body and the nozzle.

15. The apparatus of claim 10, further comprising an adjustable spacer connecting the inlet duct to the nozzle, the spacer being configured to adjust the spacing between the inlet duct and the nozzle in an axial direction along the length of the central flow axis.

16. The apparatus of claim 10, wherein the inlet end portion of the inlet duct has a first inner diameter and the outlet end portion has a second inner diameter, smaller than the first inner diameter.

17. An apparatus for extracting energy from fluid flow comprising:

- an inlet duct having an inlet end portion and an outlet end portion, the inlet duct having an annular inner surface tapering in a direction from the inlet end portion to the outlet end portion, the inlet duct defining a central flow axis;
- an elongated housing aligned along the central flow axis and extending rearwardly past the outlet end portion of the inlet duct, the elongated housing having a forward end portion and rearward end portion;
- a rotor mounted on the forward end portion of the elongated housing, the rotor comprising a plurality of rotatable blades that are rotatable about the central flow axis, the rotor being disposed within the outlet end portion of the inlet duct;
- a generator housed within the housing and connected to the rotor;
- a nozzle positioned concentrically about the elongated housing, the nozzle having a forward end portion and a rearward end portion, the forward end portion being disposed adjacent the outlet end portion of the inlet duct to define an annular flow channel between the forward end portion of the nozzle and the outlet end portion of the inlet duct for channeling fluid inwardly onto the outer surface of the elongated housing;
- wherein the nozzle has an inner surface configured to channel fluid outside of the inlet duct to flow inwardly through the flow channel and contact the outer surface of the elongated housing, thereby creating a suction seal that enhances the volume of fluid flow through the inlet duct and the blades of the rotor;
- an adjustable spacer connecting the inlet duct to the nozzle, the spacer being configured to adjust the spacing between the inlet duct and the nozzle in an axial direction along the length of the central flow axis;
- a sensor configured to measure the flow of fluid through the apparatus, the adjustable spacer being configured to automatically adjust the spacing between the inlet duct and the nozzle based on the measured flow of the fluid; and
- a flotation device supporting the inlet duct, the elongated housing and the nozzle.

* * * * *